US012759443B2

(12) United States Patent
Schmidt et al.

(10) Patent No.: US 12,759,443 B2
(45) Date of Patent: Oct. 13, 2026

(54) COVERING FOR A FASTENING DEVICE, AND VEHICLE SEAT

(71) Applicant: Adient US LLC, Plymouth, MI (US)

(72) Inventors: Claudia Schmidt, Kerpen (DE); Johan Lindqvist, Torslanda (CH); Andrew Bedwin, Langenfeld (DE); Stefan Carlsson, Goeteborg (CH); Andrea Vogel, Kerpen (DE); Sven Oldach, Remscheid (DE); Tamas Karacsonyi, Haan (DE)

(73) Assignee: Adient US LLC, Plymouth, MI (US)

( * ) Notice: Subject to any disclaimer, the term of this patent is extended or adjusted under 35 U.S.C. 154(b) by 218 days.

(21) Appl. No.: 18/522,337

(22) Filed: Nov. 29, 2023

(65) Prior Publication Data

US 2024/0181941 A1 Jun. 6, 2024

(30) Foreign Application Priority Data

Dec. 1, 2022 (DE) ..................... 10 2022 212 990.3
Jul. 6, 2023 (DE) ..................... 10 2023 206 422.7
Oct. 26, 2023 (EP) .................................... 23206194

(51) Int. Cl.
*B60N 2/60* (2006.01)
*B60N 2/28* (2006.01)
*B60N 2/58* (2006.01)

(52) U.S. Cl.
CPC ......... *B60N 2/6009* (2013.01); *B60N 2/2806* (2013.01); *B60N 2/5825* (2013.01)

(58) Field of Classification Search
CPC ... B60N 2/6009; B60N 2/2893; B60N 2/2809
See application file for complete search history.

(56) References Cited

U.S. PATENT DOCUMENTS

| | | | | |
|---|---|---|---|---|
| 6,478,376 | B2 * | 11/2002 | Hayashi | B60N 2/2839 297/250.1 |
| 7,281,763 | B1 * | 10/2007 | Hayashi | B60N 2/757 297/253 |
| 7,699,396 | B2 * | 4/2010 | Ghisoni | B60N 2/2887 297/188.2 |
| 7,758,096 | B2 * | 7/2010 | Ohta | B60N 2/286 297/250.1 |
| 9,493,099 | B2 * | 11/2016 | Ruthinowski | B60N 2/2887 |
| 9,592,750 | B2 * | 3/2017 | Asaeda | B60N 2/289 |
| 9,604,555 | B2 * | 3/2017 | Fujikake | B60N 2/2887 |
| 9,981,581 | B2 * | 5/2018 | Okuhara | B60N 2/5833 |
| 10,493,875 | B2 * | 12/2019 | Fujiwara | B60N 2/5883 |
| 11,007,909 | B2 | 5/2021 | Styn | |
| 11,046,216 | B2 | 6/2021 | Parmar et al. | |

(Continued)

FOREIGN PATENT DOCUMENTS

| | | |
|---|---|---|
| CN | 107472093 A | 12/2017 |
| DE | 19853149 C1 | 3/2000 |

(Continued)

*Primary Examiner* — David R Dunn
*Assistant Examiner* — Tania Abraham
(74) *Attorney, Agent, or Firm* — Marshall & Melhorn, LLC

(57) ABSTRACT

A covering for a fastening device for a child seat on a vehicle seat may be a three-dimensionally shaped lining strip which has at least two passage openings for the fastening device. Furthermore, a vehicle seat may have the covering.

14 Claims, 10 Drawing Sheets

(56) References Cited

U.S. PATENT DOCUMENTS

| | | | | |
|---|---|---|---|---|
| 11,731,538 | B2 * | 8/2023 | Krumbein ............ | B60N 2/6009 297/250.1 |
| 2015/0015053 | A1 * | 1/2015 | Hong ................... | B60N 2/6009 297/452.58 |
| 2016/0325659 | A1 | 11/2016 | Taguchi et al. | |
| 2018/0279791 | A1 | 10/2018 | Iwakata et al. | |
| 2020/0055427 | A1 | 2/2020 | Styn et al. | |
| 2022/0105882 | A1 | 4/2022 | Anderson et al. | |

FOREIGN PATENT DOCUMENTS

| | | | |
|---|---|---|---|
| DE | 102009006985 | A1 | 8/2010 |
| DE | 102015226302 | A1 | 3/2017 |
| DE | 102018213506 | A1 | 2/2020 |
| DE | 102019114909 | A1 | 8/2020 |
| DE | 102019213335 | A1 | 3/2021 |
| DE | 102021208805 | B3 | 2/2023 |
| JP | 2010064636 | A | 3/2010 |
| JP | 2021070357 | A | 5/2021 |

* cited by examiner

COVERING FOR A FASTENING DEVICE, AND VEHICLE SEAT

FIELD

The invention relates to a covering for a fastening device of a child seat on a vehicle seat, and to a vehicle seat having such a covering for the fastening device.

BACKGROUND

Fastening devices for fastening a child seat to a vehicle seat are known from the prior art. In the case of what is referred to as a front ISOFIX fastening device, two fastening elements which are connected at least indirectly to the vehicle seat interact with two fastening devices, what are referred to as connectors, of the child seat. In addition, a rear fastening device can be provided for an upper retaining belt of the child seat.

For this purpose, the fastening device has the two fastening elements which are at the same distance from each other as the connectors of the child seat. Each fastening element is preferably designed as a hoop according to the ISOFIX standard and is preferably formed from a multiply bent wire with a circular cross section of approximately constant diameter.

DE 198 53 149 C1 discloses a vehicle seat on which a child seat can be attached by a fastening device which is arranged on the vehicle seat between a seat cushion and a backrest. When not in use, the fastening device can be covered by a covering. That side of the covering which faces away from the fastening device forms part of the seat surface of the vehicle seat.

SUMMARY

The invention is based on the problem of improving, in particular of simplifying, a covering of the type mentioned at the beginning, and of providing a corresponding vehicle seat having such an improved covering.

The problem mentioned first is solved according to the invention by a covering for a fastening device of a child seat on a vehicle seat having the features mentioned and claimed herein. The problem mentioned second is solved according to the invention by a vehicle seat having the features mentioned and claimed herein.

The covering according to the invention is formed modularly and comprises a number of covering units. A first covering unit is designed as a three-dimensionally shaped first lining cover or first lining strip for a front fastening unit for the releasable fastening of the child seat. Alternatively or additionally, a second covering unit can be designed as a three-dimensionally shaped second lining cover or second lining strip for a rear fastening unit for the releasable fastening of the child seat.

The front fastening unit and/or the rear fastening unit are integrated in the vehicle seat using the associated covering units. The associated front covering unit and/or the associated rear covering unit can be integrated in the vehicle seat simultaneously or independently of each other and therefore separately.

For example, the front fastening unit can be designed as a positionally fixed fastening hoop for a releasable seat hook, in particular for what are referred to as ISOFIX connectors. The rear fastening unit can be designed for example as a positionally fixed anchoring for a flexible belt fastening, in particular an upper retaining belt, for example what is referred to as an upper ISOFIX retaining belt.

The respective covering designed as a three-dimensionally shaped lining strip or lining cover can have, for example, at least one passage opening or more than one passage opening, for example two passage openings, to the fastening device on the vehicle seat. A three-dimensionally shaped lining cover or lining strip is understood as meaning in particular a cover which rests on a lining front side on a seat lining and/or a cushion element and is connected thereto and partially engages around a lining opening or a cushion opening and the passage opening of which is arranged aligned with the lining opening or cushion opening.

For example, the first covering unit for the front fastening unit can have two passage openings. The second covering unit for the rear fastening unit can have, for example, a passage opening for the rear fastening unit. The respective covering unit can additionally or alternatively be configured to release access to the front fastening unit by moving away, in particular folding away upwards or downwards. In this case, the respective covering unit does not have a passage opening.

Owing to the fact that the respective covering unit is designed as at least one three-dimensionally shaped lining strip or cover (also referred to as 3D covering or 3D shaping for short), it can be sewn into a lining or sewn in with a lining or a trim for the vehicle seat or fastened, in particular inserted, in some other way.

An outer side of the in each case three-dimensionally shaped lining strip can be in the form, for example, of a decorative surface or at least partially formed decoratively. An inner side of the three-dimensionally shaped lining strip or cover can be designed, for example, as a carrier element or a fastening element. Alternatively or additionally, one or more fastening element(s), for example insertion tabs and/or sewing tabs, can be provided on the three-dimensionally shaped lining strip or cover.

The respective three-dimensionally shaped covering or the respective three-dimensionally shaped lining strip can be formed in particular from a three-dimensionally deformable and/or compressible and/or reinforceable and/or stabilizable material, in particular a fibre material, in particular from a nonwoven or another suitable plastics fibre material. For example, the three-dimensionally shaped covering or the three-dimensionally shaped lining strip can have a material thickness of between 1 mm and 5 mm, in particular between 2 mm and 3 mm. In particular, the three-dimensionally shaped covering or the three-dimensionally shaped lining strip can be designed to be inherently stiff, in particular can be formed from such a material and/or can have such a material thickness that said covering or lining strip is designed to be inherently stiff.

Using such a three-dimensionally shaped lining strip or lining cover, stitch lines in the lining can be reduced and complex regions of the trim around the fastening device on the vehicle seat, in particular around what is referred to as an ISOFIX holder (also called top-tether hoop) or an ISOFIX fastening device, can be simplified.

The material construction of the covering can comprise at least one 3D-deformable nonwoven or a similar material, in particular a 3D-shapeable plastics material which is compressed in its material thickness by 3D deformation and is stabilized in a 3D shape. In addition, low-melt fibres can be contained in the material.

A further possibility is a material construction with one or more layers, in particular with surface layers and/or carrier layers, for example made from additional surface material or carrier material. In this case, the surface layers can be fixed on the carrier material with an adhesive layer. The adhesive layer can be pre-fixed on a raw material of the carrier layer or the surface layer or can be in the form of a separate material layer. Alternatively, the three-dimensionally shaped cover strip can be formed only from a single material layer, in particular from a nonwoven material layer or plastics material layer which at the same time forms the outer side and inner side.

A vehicle seat according to the invention comprises the previously described fastening device with at least one fastening unit for a child seat and the previously described covering with at least one covering unit. The lining strip which is shaped three-dimensionally, in particular is sufficiently inherently rigid and flexible in regions, can be fastenable releasably or fixedly to the vehicle seat.

For example, the vehicle seat can comprise a cushion element which has a recess for the fastening device, wherein the covering can be arranged on the vehicle seat in such a manner that the passage opening in the covering, in particular in the lining strip or the lining cover, and the recess of the cushion element lie one above the other. For example, the covering can be releasably fixable, in particular insertable. Alternatively or additionally, the covering can be designed for a fixed connection, for example a stitched connection.

The cushion element can be covered or coverable, for example, by a seat cover. The seat cover can have at least one recess. For example, the covering can be fastenable or fastened to an underside of the seat lining and/or to the cushion element so as to cover the at least one opening in the seat lining. For example, the covering can be fastenable releasably to the cushion element using an insertion tab. Alternatively or additionally, the covering can be sewn to the seat lining using a sewing tab. The opening in the seat lining can be formed in a complementary manner to a shape and/or size of the covering. Alternatively, the seat lining can have a number of openings which are formed in a complementary manner to the passage openings in the covering. For example, the seat lining can have a number of openings which correspond in number and shape to the passage openings in the covering.

The fastening device can be designed, for example, as at least one positionally fixed fastening hoop, in particular a U-shaped hoop, and/or a positionally fixed anchoring. Two U-shaped hoops as the fastening device can be provided per child seat. The fastening device can be anchored, in particular fixed, on the cushion element and/or on a seat structure and/or a vehicle structure.

For example, the positionally fixed fastening hoop and/or the positionally fixed anchoring can be configured to releasably fasten a mating fastening means of the child seat. The mating fastening means can be, for example, a lower child seat fastening, in particular an ISOFIX fastening hook, and/or an upper child seat fastening, in particular an ISOFIX retaining belt. For example, the lower child seat fastening can be coupleable to the front fastening unit for fastening the child seat to the vehicle seat. Alternatively or additionally, the upper child seat fastening can be coupleable to the rear fastening unit for fastening the child seat to the vehicle seat.

Using the three-dimensionally shaped lining strip for covering the fastening device, in particular an ISOFIX fastening device for fastening a child seat to the vehicle seat, a cushion unit of the vehicle seat can simply cover in particular a region between a backrest cushion and a seat part cushion or a lower region of a backrest cushion or a rear region of a seat part cushion and at the same time can permit access to the fastening device on the vehicle seat. The three-dimensionally shaped lining strip for the ISOFIX fastening device is also referred to as a 3D-shaped ISOFIX lining or 3D-shaped ISOFIX covering for short. The three-dimensionally shaped lining strip covers in particular a foam structure and/or a metal structure in the rear region of the backrest cushion and/or of the seat part cushion with access at the same time to ISOFIX rods of the ISOFIX fastening device for fastening the child seat. The created shape definition of the three-dimensionally shaped cover strip permits access to the ISOFIX rods. It permits the reduction or elimination of separate plastics coverings for the ISOFIX fastening devices.

On its optionally at least partially decorative outer side, the three-dimensionally shaped lining strip has such surface materials that permit a high-frequency welding technique for embossing, for example, logos in the same process step as the 3D-shaping of the lining strip. The three-dimensionally shaped lining strip can be divided in longitudinal extent. In particular, the three-dimensionally shaped lining strip can be divided in accordance with the width of a plurality of backrests of a seat arrangement. Depending on the equipping of the backrest with ISOFIX fastening device, the three-dimensionally shaped lining strip can comprise here at least two passage openings or a multiple of two passage openings. For example, the ISOFIX covering or three-dimensionally shaped lining strip can be divided in various ways, for example as a 40-60 division of a backrest or a 40-20-40 division of a backrest or similar.

DESCRIPTION OF THE FIGURES

The invention is explained in more detail below with reference to advantageous exemplary embodiments which are illustrated in the figures. However, the invention is not restricted to these exemplary embodiments. In the figures.

DETAILED DESCRIPTION

Mutually corresponding parts are provided with the same reference signs throughout the figures.

Figure 1:
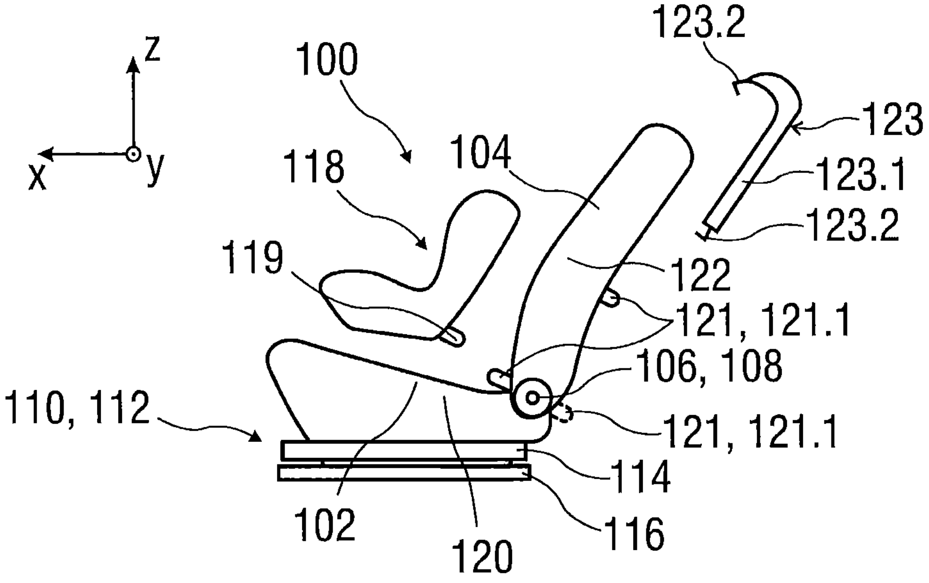
FIG. 1: shows a schematic illustration in partial exploded form of a vehicle seat with a longitudinal adjustment apparatus with a modular fastening device for a child seat.

A vehicle seat 100 which is schematically illustrated in FIG. 1 is described below using three spatial directions which run perpendicularly to one another. In the case of a vehicle seat 100 installed in the vehicle, a longitudinal direction x runs largely horizontally and preferably parallel to a vehicle longitudinal direction which corresponds to the normal direction of travel of the vehicle. A transverse direction y which runs perpendicularly to the longitudinal direction x is likewise oriented horizontally in the vehicle and runs parallel to a vehicle transverse direction. A vertical direction z runs perpendicularly to the longitudinal direction x and perpendicularly to the transverse direction y. In the case of a vehicle seat 100 which is installed in the vehicle, the vertical direction z runs preferably parallel to a vehicle vertical axis.

The positional indications and directional indications used, such as for example front, rear, top and bottom, relate to a viewing direction of an occupant seated in the vehicle seat 100 in a normal seating position, wherein the vehicle seat 100 is installed in the vehicle, in a use position suitable for passenger transport, with an upright backrest 104, and is oriented in the conventional manner in the direction of travel. The vehicle seat 100 may also be installed or moved, however, in a differing orientation, for example transversely with respect to the direction of travel. Unless described differently, the vehicle seat 100 is constructed mirror-symmetrically to a plane running perpendicularly to the transverse direction y.

The backrest 104 can be arranged pivotably on a seat part 102 of the vehicle seat 100. For this purpose, the vehicle seat 100 can optionally comprise a fitting 106, in particular an adjustment fitting, rotary fitting, latching fitting or tumbling fitting.

The positional indications and directional indications used, such as for example radially, axially and in the circumferential direction, relate to an axis of rotation 108 of the fitting 106. Radially means perpendicularly to the axis of rotation 108. Axially means in the direction or parallel to the axis of rotation 108.

The vehicle seat 100 can optionally comprise a longitudinal adjustment device 110. The longitudinal adjustment device 110 comprises, for example, a rail arrangement 112 with a first rail element 114 and a second rail element 116. The first rail element 114 is adjustable in the longitudinal direction x relative to the second rail element 116. The first rail element 114 is fastened to the seat part 102. The second rail element 116 is fastened to a structural element of a vehicle, for example to a vehicle floor.

For better clarity, the first rail element 114 is referred to in the description below as the top rail 114. The top rail 114 (also called running rail or slide) is assigned to the vehicle seat 100 and configured to carry said vehicle seat 100. The second rail element 116 is referred to below as the bottom rail 116. The bottom rail 116 is connected fixedly and, for example, to the floor of a vehicle.

A child seat 118 can be attachable to the vehicle seat 100 using a fastening device 121. The fastening device 121 can comprise, for example, a plurality of, in particular two, separate fastening units 121.1, 121.2. A front fastening unit 121.1 is configured for the releasable fastening of an associated lower mating fastening means 119. A rear fastening unit 121.2 is configured for the releasable fastening of an associated upper mating fastening means 123 of the child seat 118.

The child seat 118 can comprise in particular a claw or a hook (also called ISOFIX connectors) as the lower mating fastening means 119, for attaching and fixing to the fastening device 121, in particular to the front fastening unit 121.1, which is provided on the vehicle seat 100, in particular a seat structure, such as a seat frame, or on a vehicle structure. Additionally or alternatively, the child seat 118 can comprise, as the upper mating fastening means 123, an upper retaining belt 123.1 which is fastenable releasably to the rear fastening unit 121.2 on the vehicle seat 100, in particular on the seat structure, for example a seat frame, or on the vehicle structure.

The upper mating fastening means 123 is designed as a retaining belt 123.1 which is provided at its ends with retaining means 123.2, in particular hooks, which are fastenable releasably into the rear fastening unit 121.2 and/or to the backrest 104.

The fastening device 121, in particular what is referred to as an ISOFIX fastening device, such as for example a positionally fixed fastening hoop, such as a U-shaped hoop, and/or a positionally fixed anchoring, such as a hook receptacle, can be arranged on the vehicle seat 100 at the front and/or rear between a seat part cushion 120 of the seat part 102 and a backrest cushion 122 of the backrest 104.

Figure 2:
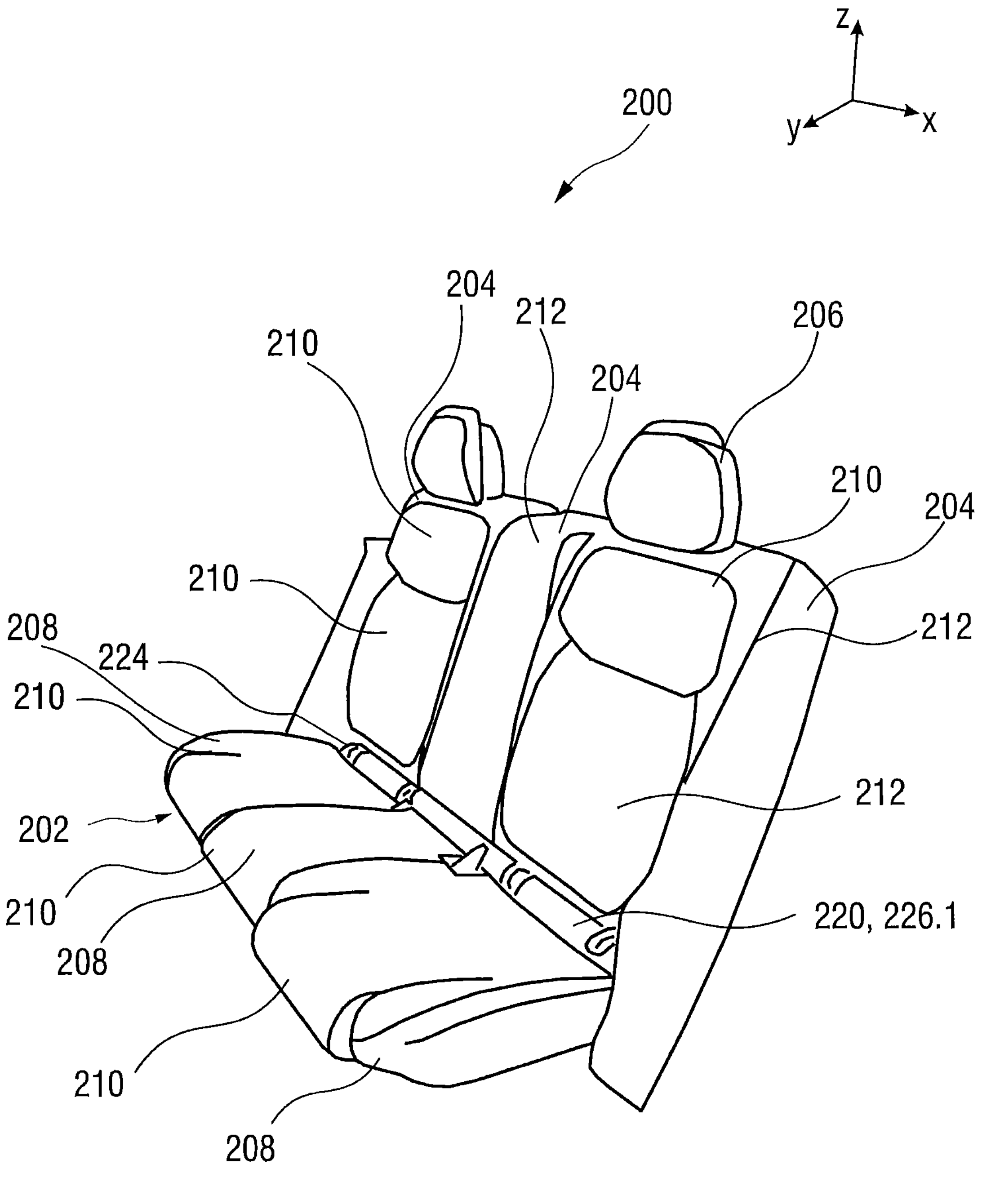
FIG. 2: shows a perspective illustration obliquely from the front and from the side of a seat arrangement consisting of a seat bench and a plurality of divided backrests, wherein a covering for a fastening device for a child seat is arranged between the seat bench and backrest.

FIG. 2 shows a perspective illustration obliquely from the front and from the side of a seat arrangement 200 with a seat bench 202 and a divided backrest 204. The seat bench 202 can be designed as a single-part seat surface. Alternatively, the seat bench 202 can also be divided into a plurality of seat surfaces.

The plurality of divided backrests 204 can differ in width or be identical in width. In the example shown, two outer backrests 204 are identical in width and a middle backrest 204 is smaller in width. A headrest 206 can be arranged on each of the backrests 204.

In addition, correspondingly shaped lining cushions 210 (also called upholstery cushions) can be arranged on a seat part cushion 208 of the seat bench 202 and/or on backrest cushions 212 of the backrests 204.

A covering 220 according to the invention for the desired ISOFIX fastening device 121, in particular not visible when not in use, is arranged on the seat arrangement 200 between the seat bench 202 and the backrests 204, in particular between the cushions thereof.

The covering 220 can extend, for example, over the entire width of the seat arrangement 200 or only over portions, in particular only over the width of the fastening devices 121 in the transverse direction y. The covering 220 can be divided here corresponding to the width of the backrests 204.

The ISOFIX fastening device 121 can be covered by the covering 220 in such a manner that said ISOFIX fastening device continues to be accessible through passage openings 222 (illustrated in FIG. 3) and/or by manual operation of, in particular moving away, for example folding away, the covering 220 upwards or downwards or to the side or by removal of the covering 220.

The outer side 224 of the covering 220 facing away from the ISOFIX fastening device 121 forms part of the seat surface of the respective vehicle seat 100 or of the seat arrangement 200 with a plurality of seat surfaces.

The covering 220 can be arranged, for example, on the vehicle seat 100 in such a manner that the passage opening 222 in the covering 220 and recesses in the cushion element or an intermediate space between two cushion elements of the vehicle seat 100 lie one above another and the fastening device 121 is accessible from the outside through them for fastening the child seat 118 to said fastening device 121.

Figure 3:
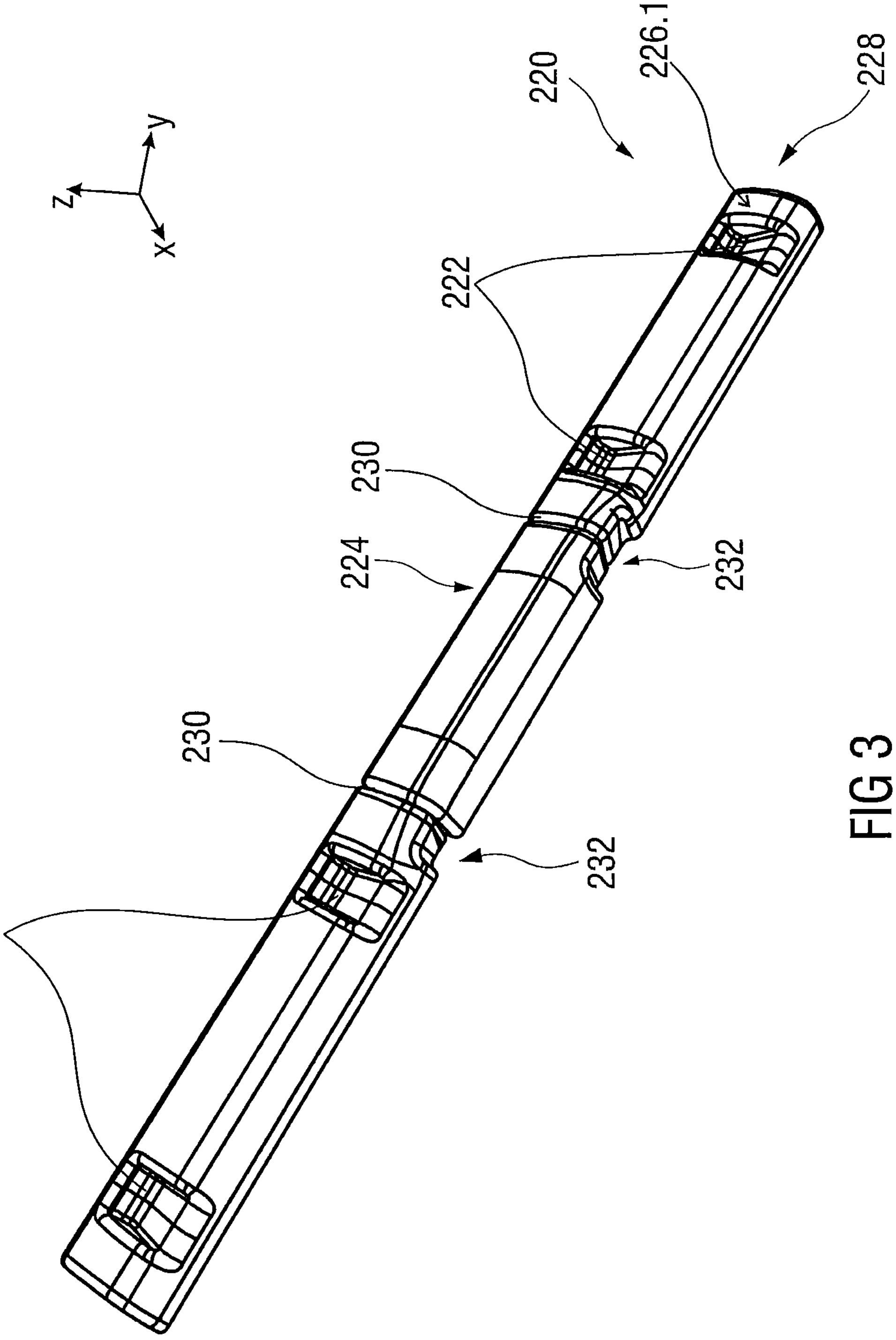
FIG. 3: shows a perspective illustration of the covering according to FIG. 2 in detail.

FIG. 3 shows a perspective illustration of the covering 220 according to FIG. 2 in detail.

The covering 220 is designed as a front or first covering unit 220 (called front covering unit 220 below for better clarity) and comprises an associated three-dimensionally shaped front or first lining strip 226.1 (also called lining cover).

The outer side 224 of the front lining strip 226.1 can optionally be designed as a decorative surface. The front covering unit 220, in particular the front three-dimensionally shaped lining strip 226.1, can be divided in its longitudinal extent on the outer side 224 corresponding to the width of the backrests 204. For example, the single-piece front covering unit 220 can be provided for this purpose with separating grooves 230 on the outer side 224.

Here, depending on the equipping of the backrests 204 without or with ISOFIX fastening devices 121 (illustrated in FIG. 1), the front three-dimensionally shaped lining strip 226.1 can comprise no or at least one passage opening 222 or a plurality of, for example two, passage openings 222 (in the case of only one ISOFIX fastening device 121) or a multiple of two passage openings 222 (in the case of a plurality of ISOFIX fastening devices 121). For example, the front ISOFIX covering unit 220 or three-dimensionally shaped front lining strip 226.1 can be divided in various ways by the separating grooves 230, for example as a 40-60 division of a backrest 204 or a 40-20-40 division of a backrest 204 or similar.

Owing to the fact that the front covering unit 220 is designed as a three-dimensionally shaped front lining strip 226.1, it can be sewn into a lining, not illustrated specifically, (also called seat lining) or into the seat part cushion 208 or can be sewn with such a lining or with the seat part cushion 208 or a trim for the vehicle seat 100 or with the seat arrangement 200 or fastened in some other way.

An inner side 228 (illustrated in FIGS. 7 to 9) of the three-dimensionally shaped front lining strip 226.1 can be designed for example as a carrier element or a fastening.

The three-dimensionally shaped front covering unit 220, in particular the three-dimensionally shaped front lining strip 226.1, can be formed in particular from a three-dimensionally deformable and/or compressible and/or reinforceable and/or stabilizable material, in particular a fibre material, in particular from a nonwoven or another suitable plastics fibre material.

The material construction of the front covering unit 220 can comprise at least one 3D-deformable nonwoven or a similar material which is compressed in its material thickness by 3D deformation and is stabilized in a 3D shape. In addition, low-melt fibres can be contained in the material. A further possibility is a material construction with one or more layers, in particular with surface layers and/or carrier layers, for example made from additional surface material or carrier material. In this case, the surface layers can be fixed on the carrier material with an adhesive layer. The adhesive layer can be pre-fixed on a raw material of the carrier layer or the surface layer or can be in the form of a separate material layer.

Alternatively, the three-dimensionally shaped front covering unit 220, in particular the three-dimensionally shaped front lining strip 226.1, can be formed only from a single material layer, in particular from a nonwoven material layer which at the same time forms the outer side 224 and the inner side 228.

Using the three-dimensionally shaped front lining strip 226.1 for covering the fastening device 121, in particular the front fastening unit 121.1 for fastening the child seat 118 (illustrated in FIG. 1) to the vehicle seat 100 or to the seat arrangement 200, a region between the backrest cushion 212 and the seat part cushion 208 or a lower region of the backrest cushion 212 or a rear region of the seat part cushion 208 can easily be covered and at the same time can permit access to the fastening device 121 on the vehicle seat 100 or to the seat arrangement 200.

The front covering unit 220 can also be configured in such a manner that the front fastening unit 121.1 can be reached only by previous manipulation (folding upward, downward or removal)—in which case no passage openings 222 are provided in the front lining strip 226.1.

The created shape definition of the three-dimensionally shaped front lining strip 226.1 permits access to the ISOFIX rods via the passage openings 222.

On its optionally at least partially decorative outer side 224, the three-dimensionally shaped front lining strip 226.1 has such surface materials that permit a high-frequency welding technique for embossing, for example, logos in the same process step as the 3D-shaping of the front lining strip 226.1.

In addition, the front lining strip 226.1 can have mouldings 232 or incisions or no dimensional change but just a logo for the ISO fixing hoop. The respective mouldings 232 serve in particular as receptacles of one or more belt buckles, not illustrated, of the seat bench 202.

Figure 4:
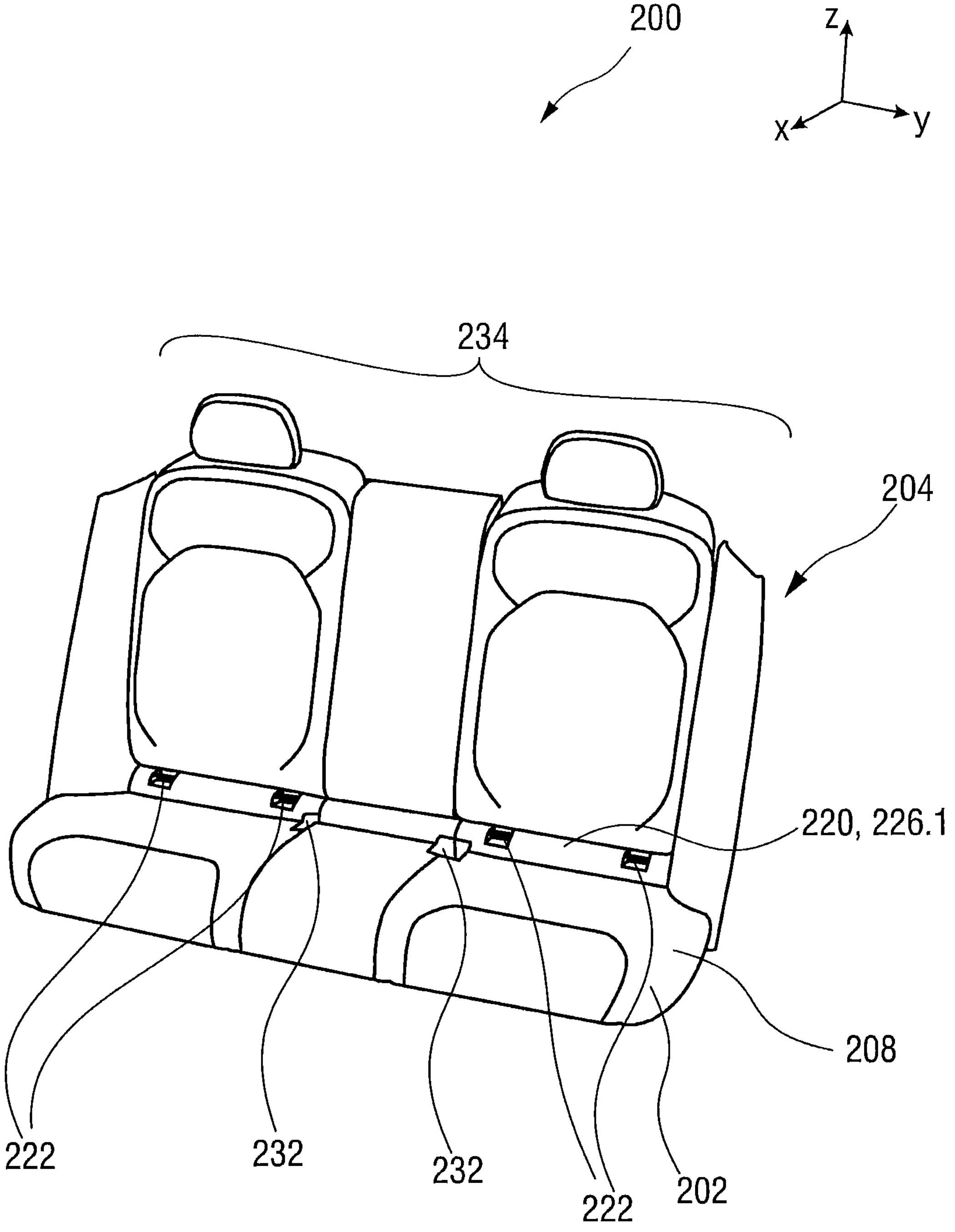
FIG. 4: shows a perspective illustration obliquely from the front of the seat arrangement according to FIG. 2, FIG. 5: shows the covering according to FIG. 2 schematically in a view from above.

FIG. 4 shows a perspective illustration obliquely from the front of the seat arrangement 200 according to FIG. 2 with the front covering unit 220 according to FIG. 3 between the backrest 204 and the seat part cushion 208.

The front covering unit 220 preferably extends over the entire width of a seat region 234 of the seat bench 202. In the exemplary embodiment which is shown, the front covering unit 220 comprises four passage openings 222, in each case two for a fastening device 121 and two mouldings 232 for belt buckles of the seat bench 202. The front covering unit 220 can have more or fewer passage openings 222 and more or fewer mouldings 232 depending on the design of the seat region 234.

Figure 5:
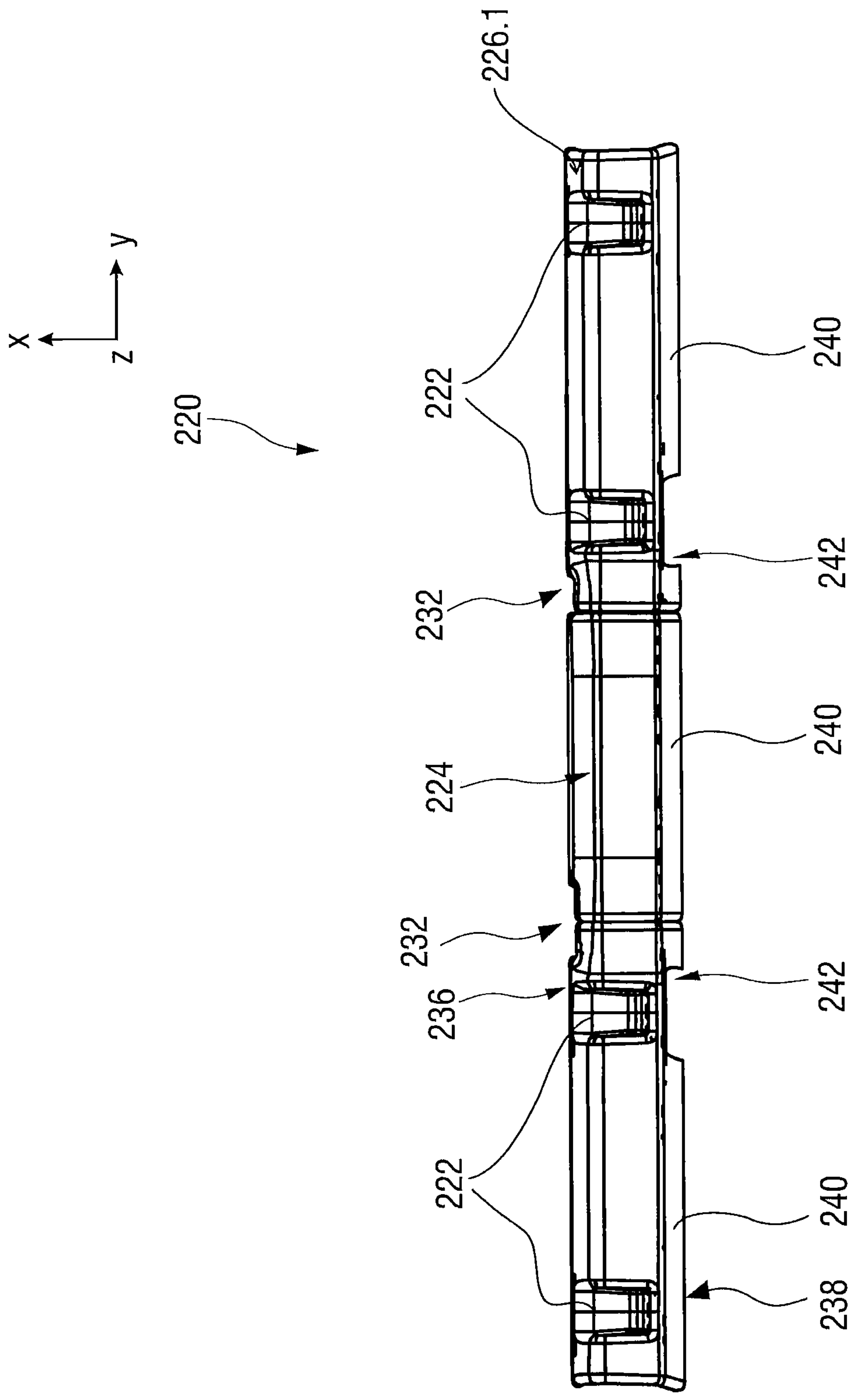

FIG. 5 shows the front covering unit 220 according to FIG. 2 schematically in a view from above. The front covering unit 220 in each case comprises, on the outer side 224, a pair of passage openings 222 for in each case one pair of fastening devices 121, in particular front fastening units 121.1, for example U-shaped safety hoops.

The front covering unit 220 comprises the mouldings 232 for the belt buckles on one edge 236, in particular a lower edge, of the outer side 224, and at least one or more fastening elements 240, in particular a sewing tab, on the opposite edge 238, in particular on an upper edge. The fastening element 240 or the fastening elements 240 can be interrupted by cutouts 242. The cutouts 242 serve for example for receiving backrest adjusters of the backrest 204.

The covering 220 can cover an intermediate space between the seat part cushion 208 and the backrest cushion 212 (illustrated in FIG. 2). The covering 220 can be fastened, for example, by the fastening elements 240 to a seat lining of one of the cushion elements, the backrest cushion 212 or the seat part cushion 208, in particular connected by a connecting seam. Here, the respective cushion element can be covered or coverable, for example, by the seat lining, not illustrated. The seat lining can have at least one complementary recess. The covering 220 can be arranged on an underside of the seat lining, for example, covering the at least one opening in the seat lining, for example can be sewn to said seat lining.

The vehicle seat 100 can alternatively comprise a cushion element, for example the seat part cushion 208 or backrest cushion 212 which has a recess, not illustrated, for the fastening device 121, in particular the front fastening unit 121.1 and/or the rear fastening unit 121.2 (illustrated in FIG. 1). The front covering unit 220 which is in the form of a front lining strip 226.1 can be arrangeable on the vehicle seat 100 in such a manner that the passage opening(s) 222 of the front covering unit 220 and the recess of the cushion element lie one above another. Alternatively or additionally, the front covering unit 220 can be releasably fixable, in particular insertable.

Figure 6:
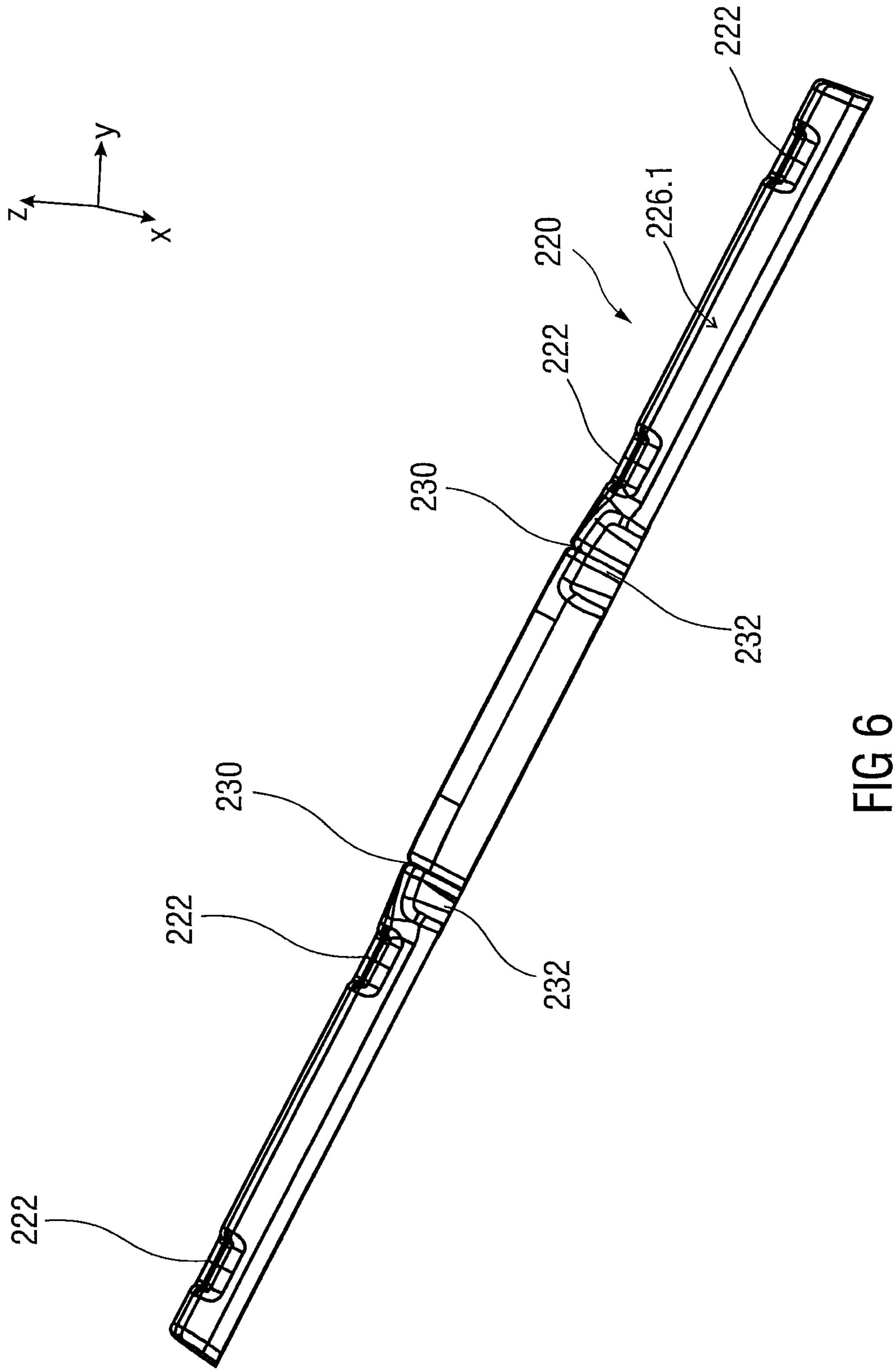
FIG. 6: shows the covering according to FIG. 2 schematically in a view from the front.

FIG. 6 shows, schematically in a view from the front, the front covering unit 220, which is in the form of a front lining strip 226.1, according to FIG. 2 with the passage openings 222 for the fastening devices 121, in particular for the front fastening unit 121.1 (illustrated in FIG. 1), the mouldings 232 and the separating grooves 230.

Figure 7:
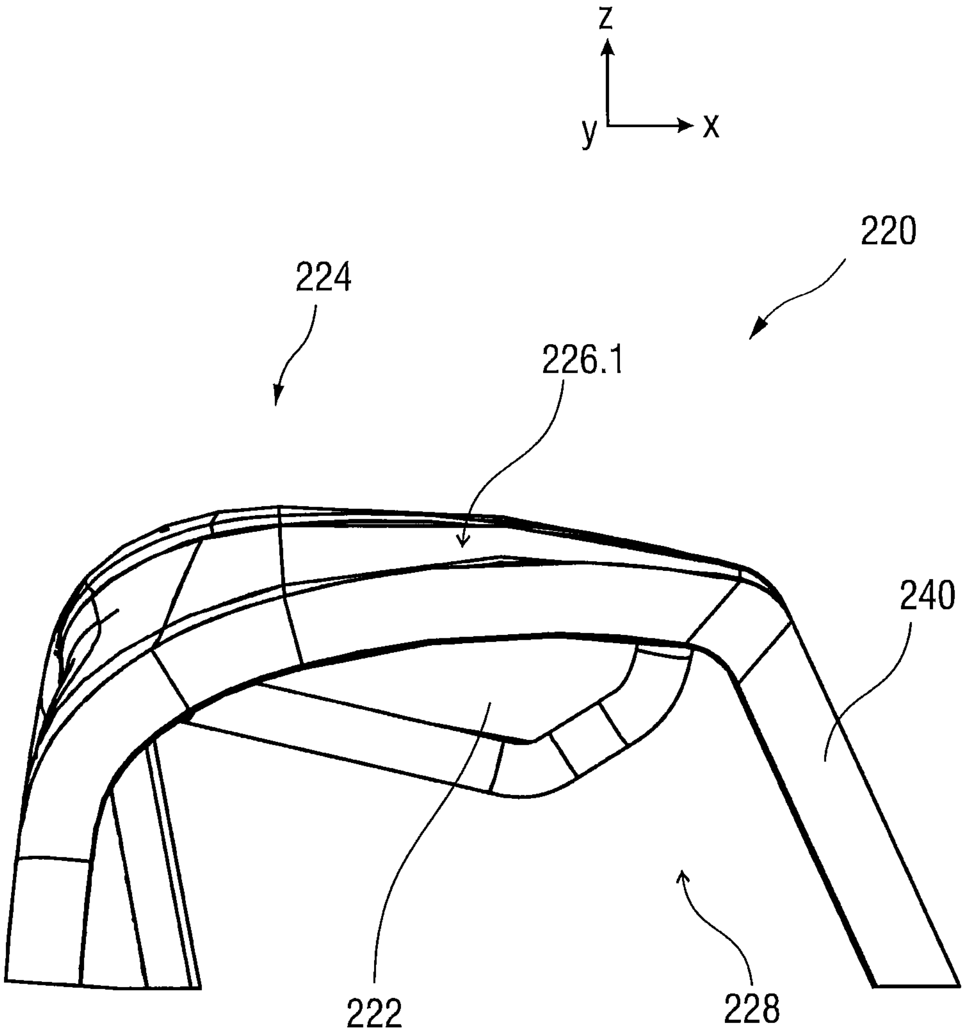
FIG. 7: shows the covering according to FIG. 2 schematically in a side view.

FIG. 7 shows, schematically in side view, the front covering unit 220, which is in the form of a three-dimensionally shaped front lining strip 226.1, according to FIG. 2. The front lining strip 226.1 has a U shape in section. The fastening element 240, which is in the form, for example, of a sewing tab, forms in particular a side wall which is angled from the outer side 224. The passage openings 222 are in the form, for example, of passage webs.

Figure 8:
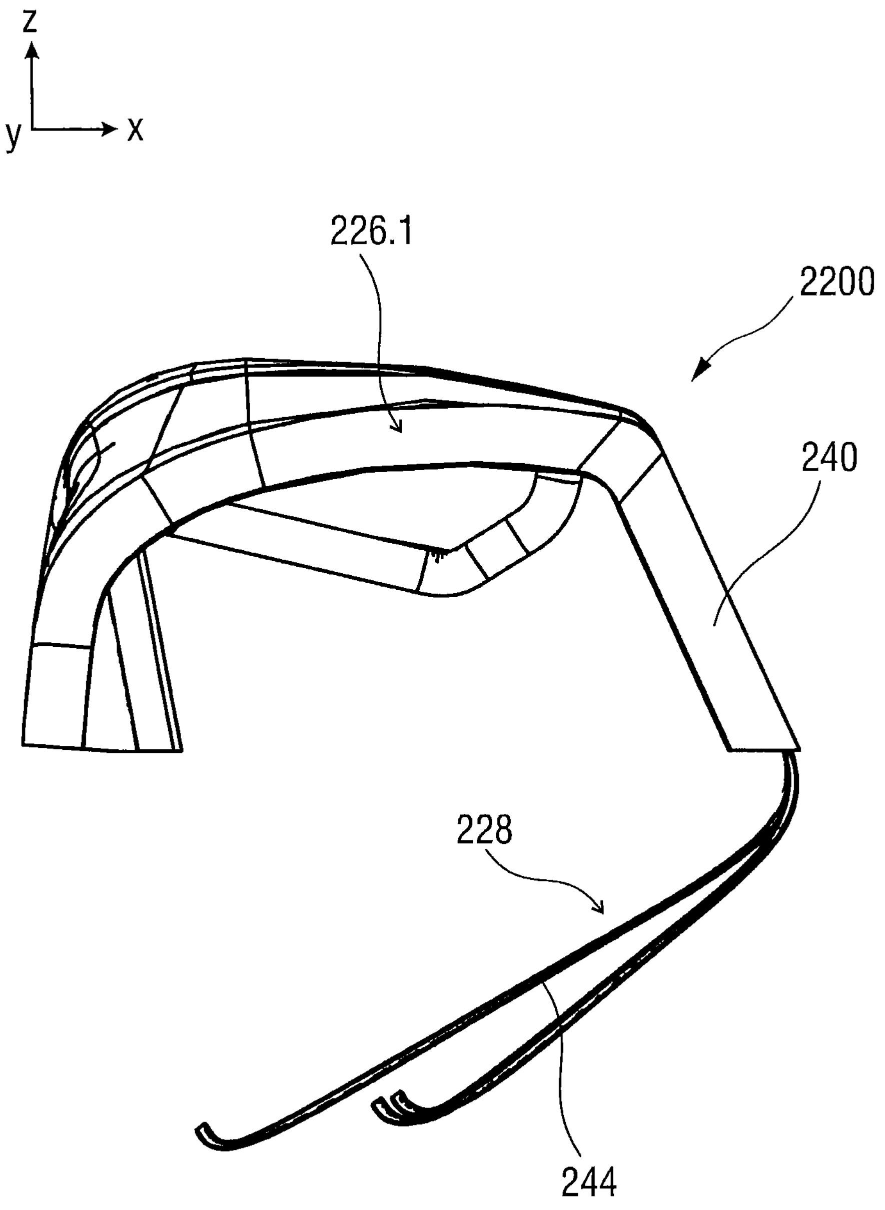
FIG. 8: shows a further exemplary embodiment of a covering for a fastening device schematically in a side view.

FIG. 8 shows, schematically in side view, a further exemplary embodiment of a covering 2200 for the fastening device 121, in particular the front fastening unit 121.1 (illustrated in FIG. 1). The covering 2200 (also referred to as front covering unit 2200) in the form of a three-dimensionally shaped front lining strip 226.1 differs from the covering 220 according to FIGS. 2 to 7 only in the type of fastening elements 240. The fastening element 240 can additionally have an extended portion 244 in the form, for example, of an insertion tab. The extended portion 244 can be formed from a different material, in particular a resilient material, for example a spring tongue. The extended portion 244 is illustrated in different positions in FIG. 8.

The covering 2200 can be fastenable releasably to the vehicle seat 100, in particular in an intermediate space between the seat part cushion 208 and the backrest cushion 212 (illustrated in FIG. 2) using the insertion tab, for example.

Figure 9:
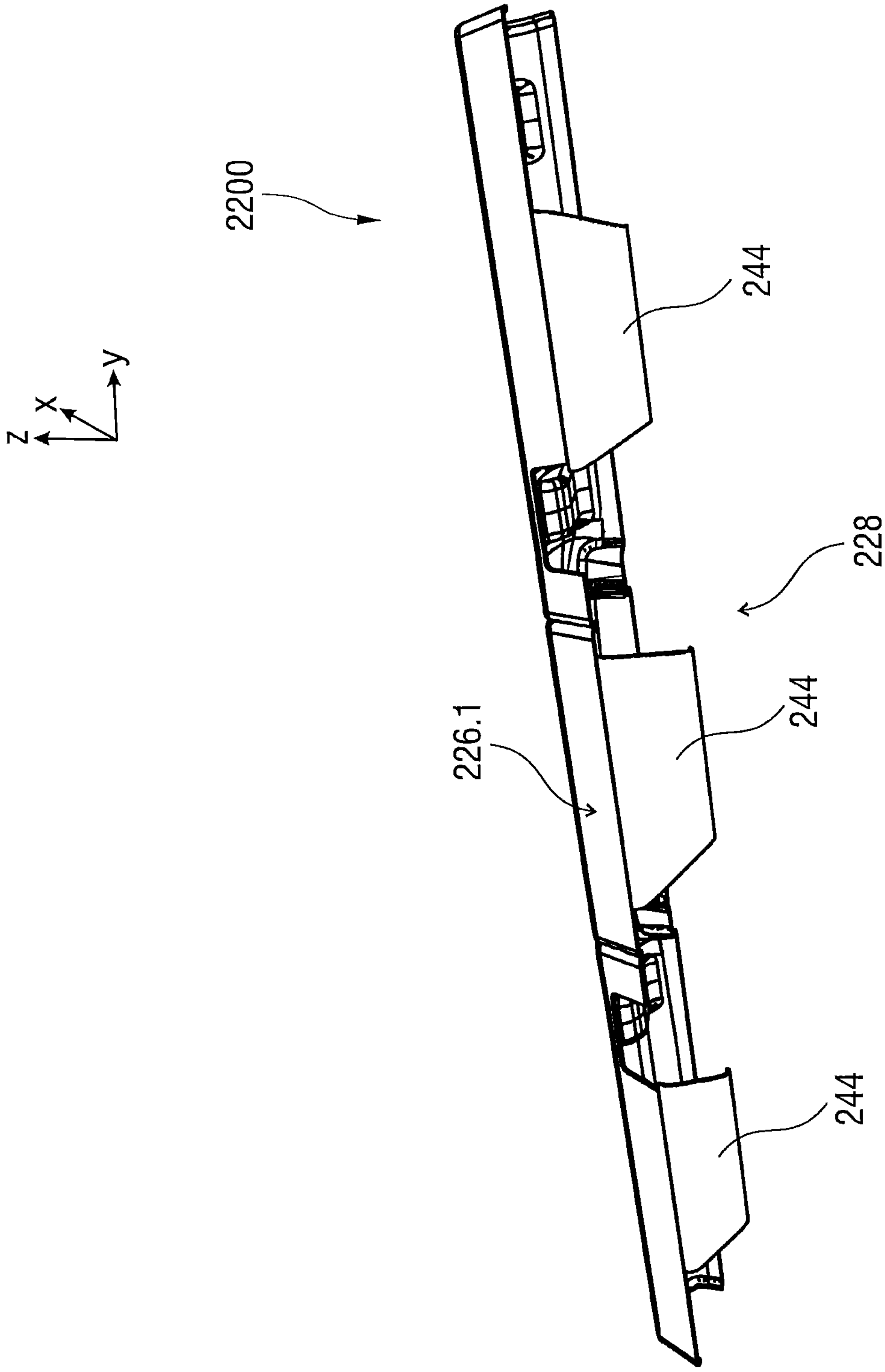
FIG. 9: shows the covering according to FIG. 8 schematically in a view from the rear.

FIG. 9 shows schematically, in a view from the rear, the covering 2200 according to FIG. 8 with the flexible extended portions 244 which are in the form of insertion tabs.

Figure 10:
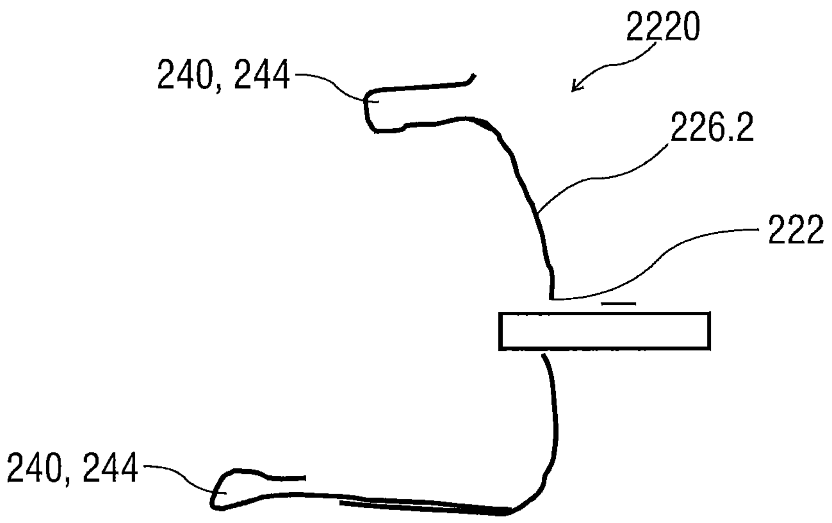
FIG. 10: shows an example of a rear covering unit for a rear/upper child seat fastening schematically in a side view.

FIG. 10 shows, schematically in side view, a further example of a covering 2220, which is in the form of a rear covering unit, for a rear and/or upper child seat fastening. The covering 2220 (also referred to as rear covering unit 2220) is configured in respect of material and material construction and also 3D shape analogously to the coverings 220 and 2200 which are in the form of front covering units 220, 2200. The rear covering 2220 is likewise in the form of a three-dimensionally shaped rear lining strip 226.2.

The rear lining strip 226.2 differs in particular in the number of passage openings 222 and the type of fastening elements 240 for fastening the covering 2220 to the vehicle seat 100.

The rear covering 2220 comprises an individual passage opening 222 for the upper mating fastening means 123, in particular for the upper retaining belt 123.1 (illustrated in FIG. 1).

The rear lining strip 226.2 can have, for example, integrated extended portions 244 as fastening elements 240, which are in the form, for example, of clamps, latching clips, spring clips or the like.

Figure 11:
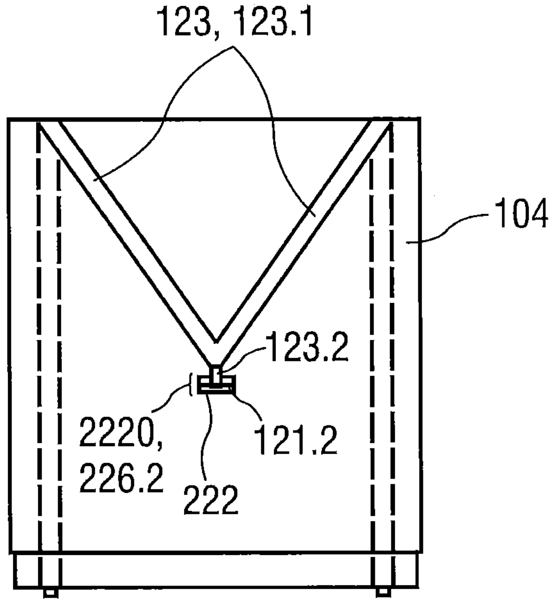
FIG. 11 shows a backrest of a vehicle seat with an upper child seat fastening schematically in a view from the rear.

FIG. 11 shows, schematically in a view from the rear, the backrest 104 of the vehicle seat 100 with a rear/upper child seat fastening in the form of a retaining belt 123.1. The retaining belt 123.1 can be fastened once or multiple times to the backrest 104. The retaining belt 123.1 can be fastened to the backrest 104 crosswise, parallel and/or connected multiple times (illustrated by dashed lines).

The three-dimensionally shaped rear lining strip 226.2 has the passage opening 222 in the centre for the retaining means 123.2, in particular a hook, a clip or the like, of the upper mating fastening means 123. The retaining belt 123.1 can be provided with one of the retaining means 123.2 at each of its free ends.

The rear lining strip 226.2 can be designed as a frame-shaped cover, in particular a rectangular cover. The lining strip 226.2 can have, as the rear fastening unit 121.2, a bolt or a pin, in particular a transverse bolt or a transverse pin, in which the hook-shaped retaining means 123.2 releasably hooks. The fastening unit 121.2 is covered by the frame-shaped lining strip 226.2.

LIST OF REFERENCE SIGNS

100 vehicle seat
102 seat part
104 backrest
106 fitting
108 axis of rotation
110 longitudinal adjustment apparatus
112 rail arrangement
114 first rail element (top rail)
116 second rail element (bottom rail)
118 child seat
119 lower mating fastening means
120 seat part cushion
121 fastening device
121.1 front/first fastening unit
121.2 rear/second fastening unit
122 backrest cushion
123 upper mating fastening means
123.1 retaining belt
123.2 retaining means
200 seat arrangement
202 seat bench
204 backrest
206 headrest
208 seat part cushion
210 lining cushion
212 backrest cushion
220, 2200 covering/front covering unit
2220 covering/rear covering unit
222 passage opening
224 outer side
226.1 front/first lining strip
226.2 rear/second lining strip
228 inner side
230 separating groove
232 moulding
234 seat region
236 edge
238 opposite edge
240 fastening element
242 cutout
244 extended portion
x longitudinal direction
y transverse direction
z vertical direction

The invention claimed is:

1. A vehicle seat comprising at least one fastening device for a child seat, a covering for the at least one fastening device, and at least one cushion element which has a recess for the fastening device, wherein the covering is formed modularly and comprises a number of covering units, wherein a first covering unit is designed as a three-dimensionally shaped first lining strip for a front fastening unit of the child seat and/or a second covering unit is designed as a three-dimensionally shaped second lining strip for a rear fastening unit of the child seat, wherein the covering can be arranged on the vehicle seat in such a manner that a passage opening of the covering and the recess of the cushion element lie one above the other and the fastening device is accessible from the outside through them in order to fasten the child seat to said fastening device.

2. The vehicle seat according to claim 1, wherein the cushion element is covered or coverable by a seat cover, and the covering is fastenable or fastened to an underside of the seat cover and/or to the cushion element so as to cover at least one opening in the seat cover.

3. The vehicle seat according to claim 2 wherein the seat cover has a number of openings which correspond in number and shape to the passage openings in the covering.

4. The vehicle seat according to claim 1, wherein the fastening device is designed as at least one positionally fixed fastening hoop, a U-shaped hoop and/or a positionally fixed anchoring.

5. The vehicle seat according to claim 4, wherein the positionally fixed fastening hoop and/or the positionally fixed anchoring is or are configured to releasably fasten a mating fastening device of the child seat.

6. The vehicle seat according to claim 5, wherein the mating fastening device is a lower child seat fastening and/or an upper child seat fastening.

7. The vehicle seat according to claim 6, wherein the lower child seat fastening can be coupled to the front fastening unit and/or the upper child seat fastening can be coupled to the rear fastening unit.

8. A vehicle seat comprising at least one fastening device for a child seat, a covering for the at least one fastening device, and at least one cushion element which has a recess for the fastening device, wherein the covering is formed modularly and comprises a number of covering units, wherein a first covering unit is designed as a three-dimensionally shaped first lining strip for a front fastening unit of the child seat and/or a second covering unit is designed as a three-dimensionally shaped second lining strip for a rear fastening unit of the child seat, wherein the cushion element is covered or coverable by a seat cover, and the covering is fastenable or fastened to an underside of the seat cover and/or to the cushion element so as to cover at least one opening in the seat cover.

9. The vehicle seat according to claim 8, wherein the seat cover has a number of openings which correspond in number and shape to the passage openings in the covering.

10. The vehicle seat according to claim 8, wherein the covering can be arranged on the vehicle seat in such a manner that a passage opening of the covering and a recess of the cushion element lie one above the other and the fastening device is accessible from the outside through them in order to fasten the child seat to said fastening device.

11. The vehicle seat according to claim 8, wherein the fastening device is designed as at least one positionally fixed fastening hoop, a U-shaped hoop and/or a positionally fixed anchoring.

12. The vehicle seat according to claim 11, wherein the positionally fixed fastening hoop and/or the positionally fixed anchoring is or are configured to releasably fasten a mating fastening device of the child seat.

13. The vehicle seat according to claim 12, wherein the mating fastening device is a lower child seat fastening and/or an upper child seat fastening.

14. The vehicle seat according to claim 13, wherein the lower child seat fastening can be coupled to the front fastening unit and/or the upper child seat fastening can be coupled to the rear fastening unit.

* * * * *